Dec. 1, 1964 J. J. TIEMANN 3,159,816

CENTRAL TO REMOTE INTERROGATION SYSTEM

Filed May 31, 1961

Inventor:
Jerome J. Tiemann,
by Joseph V. Claeys
His Attorney

United States Patent Office 3,159,816
Patented Dec. 1, 1964

3,159,816
CENTRAL TO REMOTE INTERROGATION SYSTEM

Jerome J. Tiemann, Burnt Hills, N.Y., assignor to General Electric Company, a corporation of New York
Filed May 31, 1961, Ser. No. 113,856
11 Claims. (Cl. 340—147)

Figures 1, 2:
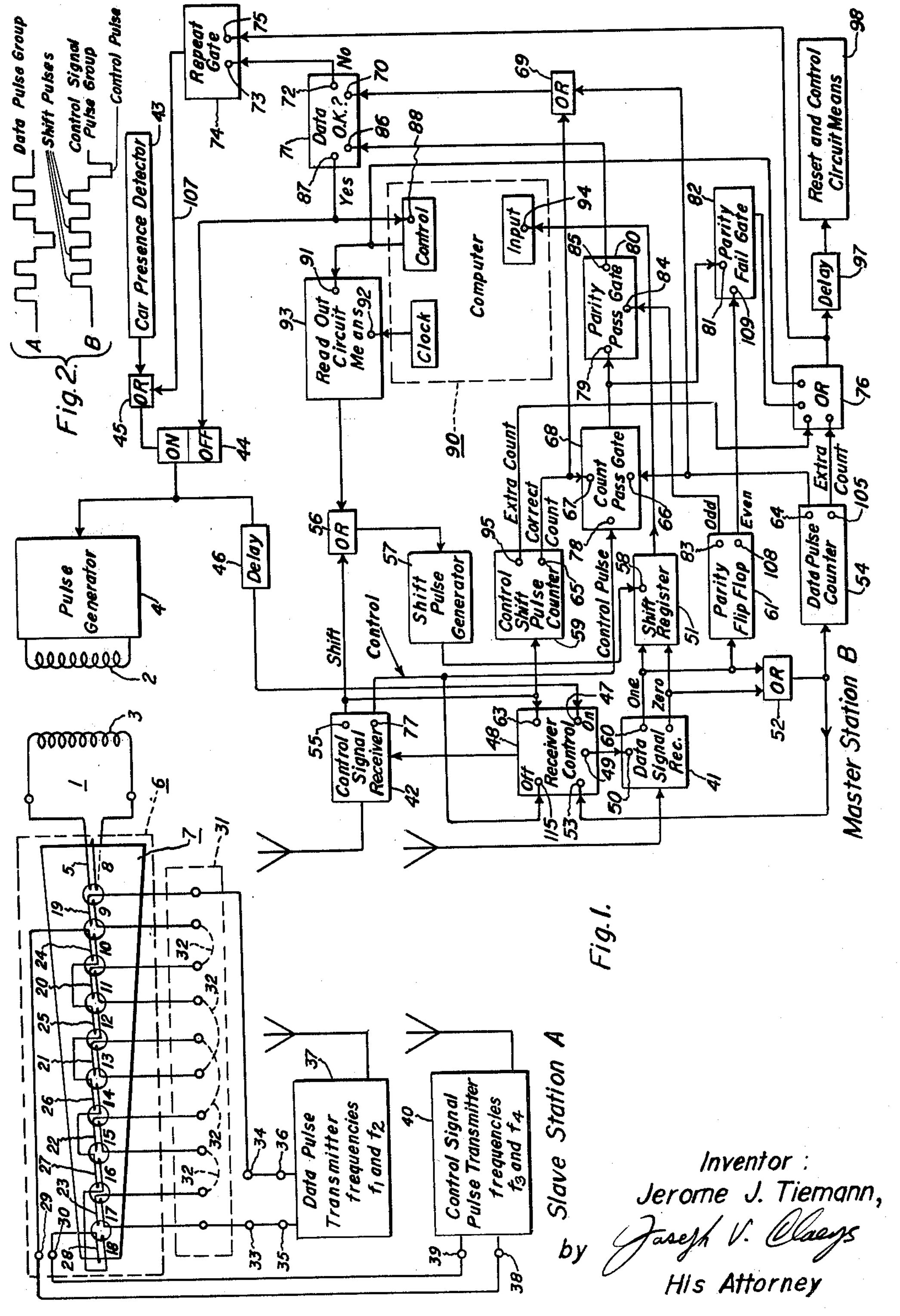

This invention relates to communication systems and in particular to an improved communication system in which coded data to be determined from a large number of slave stations is transformed and transmitted in the form of a group of pulses spaced in time and of predetermined arrangement in response to an interrogating signal from one of a plurality of master stations; the particular arrangement of the pulses being dependent upon the data which is represented.

While this invention is subject to a wide range of applications, it is especially suited for use wherein preassigned data at a large number of slave stations are desired in response to an interrogating signal from a master station. The large number of slave stations involved, each of which is required to transform and transmit specific preassigned data to the master station, requires that the apparatus at each of the slave stations be as simple and inexpensive as possible. In addition, the apparatus at each slave station must ordinarily be extremely rugged so as to withstand shocks and other forms of abuse as well as being substantially maintenance-free.

One specific application of this type, for example, and the application with which this invention will be particularly described, is that of determining certain assigned data from railroad cars, such as car number and owner, in response to an interrogating signal from a control station as a particular train, including a large number of such cars, passes a predetermined location. The system employed for such applications, therefore must be extremely reliable and its operation must be substantially unaffected over a wide range of environmental conditions. For example, the system must provide reliable operation under such conditions as rain, mud, snow, ice, light, darkness and the like, as well as under conditions involving large variations in temperature.

This invention is an improvement over the invention of the application of Robert L. Watters, Serial No. 98,098, filed March 24, 1961, and assigned to the assignee of the present invention, which invention was made by the said Robert L. Watters prior to my invention. I therefore, do not herein claim anything shown or described in the said Watters application, which is to be regarded as prior art with respect to this present invention.

The communication system of the Watters application, Serial No. 98,098, comprises, in one embodiment, one or more central interrogating stations and a plurality of coded stations to be interrogated, each possessing preassigned data to be ascertained. Means are provided at each of the coded stations for receiving an interrogating signal, and means for transforming and transmitting the preassigned data, in the form of a selected group of time spaced pulses, in response to a received interrogating signal. Means are provided at the interrogating station for generating and transmitting an interrogating signal to each of a predetermined group of the coded stations in turn, for receiving the selected group of pulses representative of the assigned data of the respective coded stations interrogated, and for coincidence-gating each of the received groups of pulses in turn with locally produced time synchronized pulses also initiated by the interrogating signal to obtain and store an output corresponding to the transmitted data.

The invention disclosed and claimed in the above-identified Watters application is completely satisfactory for a wide variety of applications of this type. For some applications, however, it is desirable that the information received from the coded or slave stations interrogated be in a form which is more compatible with modern electronic computing or data processing equipment. It is desirable, therefore, that further development be made of communication systems of this type.

Communication systems which utilize a train of pulses to transmit binary data are well-known. These prior art systems, however, usually require that a given data pulse appear at a definite time with respect to a synchronizing pulse in order that the data pulse may be correctly interpreted. The accuracy of such timing becomes especially critical when a large number of data pulses are sent between synchronizing pulses. To assure reliable operation of the system, therefore, means are required to provide for accurate timing between the pulses. Since such timing means are expensive and contribute to both the cost and the complexity of the communication system it is highly desirable to obviate the need therefor. This is especially desirable in a communication system of the type to which this invention relates since the cost of the equipment employed at the great many coded slave stations is an extremely important factor.

It is an object of this invention, therefore, to obviate the need for such timing means by developing a synchronizing signal from the same means which develops the data signal, which signals are simultaneously transmitted on separate channels and, therefore, cannot become unsynchronized no matter how unevenly spaced in time the pulses may be.

It is another object of this invention, therefore, to provide an improved communication system of this type having great reliability and wherein the information received at the master station from an interrogated slave station is converted into a form compatible, and in synchronism with modern electronic computing and data processing equipment.

It is another object of this invention to provide a communication system of this type wherein binary information as well as control information is derived and transmitted from a slave station in response to an interrogating signal from a master station.

It is a further object of this invention to provide a communication system of this type wherein the data received at the master station from an interrogated slave station is operated upon by a combination of circuit means responsive to received and locally produced signals to provide increased reliability and assurance that spurious signals are not interpreted by the master station as transmitted data.

It is a still further object of this invention to provide a communication system of this type wherein the master station includes a plurality of circuit means for checking, counting, storing and otherwise operating upon data received from an interrogated slave station and, in response to a signal from an associated electronic computer, transferring the checked and stored data thereto.

It is yet another object of this invention to provide a communication system of this type wherein the interrogating station includes a novel combination of reliability checking equipment, responsive to a received control signal, to assure that the received information is correct or, if incorrect, repeat the interrogation of that station.

It is a still further object of this invention to provide a communication system wherein identifying data from a plurality of slave stations are transformed and transmitted in the form of time spaced binary information pulses in response to a received interrogating signal thereby and in which accurate pulse timing is not required.

Briefly stated, in accordance with one aspect of this invention, the improved communication system comprises one or more master stations and a plurality of coded slave stations. In response to a received interrogating signal from a master station, the selected coded slave station produces two groups of bi-polar time spaced pulses; one group representing the data assigned to that station in binary form and the other group providing a control signal marking the spaces between the data pulses. The data pulse group is transmitted to the interrogating master station on a first pair of "polarity-oriented" frequencies and the control signal pulse group on a second pair of "polarity-oriented" frequencies.

Means are provided at the master station for generating and transmitting an interrogating signal, for alternately receiving the two pairs of polarity-oriented frequencies, and for parity checking, counting, storing, synchronizing and relaying the received data to an associated electronic computer.

As used throughout the specification and in the appended claims the term "polarity-oriented" is used to designate that pulses of one polarity are associated with one frequency and pulses of opposite polarity with a different frequency.

The novel features which are characteristic of my invention are set forth with particularity in the appended claims. My invention itself, however, both as to its organization and method of operation, together with further objects and advantages thereof may best be understood by reference to the following description taken in conjunction with the accompanying drawing in which:

FIG. 1 illustrates, in schematic and block diagram form, the features of the present invention, FIG. 2 illustrates graphically various waveforms useful in explaining the operation of the overall system illustrated in FIG. 1.

The identity of railroad cars is basic information which is required over and over again as cars are moved in the railroad system. It is an important link in most of the data processing routines in use by railroads and is essential information in many decisions operating personnel are required to make.

In general, two basic groups of equipment are required for a practical railroad car identification system. One group includes particular information about the car and is intimately associated therewith. The other group serves the function of reading the information associated with the group of equipment on the car. This latter group of equipment may be stationary and located so that it can read the information as cars pass along a portion of track in the vicinity of the location of the equipment.

In view of the great number of cars involved and the importance of the identity of the cars to the efficient operation of the railroad system, it is readily apparent that there is a present need for a reliable, high speed railroad car identification system. Further, in view of the great number of cars involved as well as the many different owners thereof, it is equally apparent that the group of equipment associated with the cars must be capable of encoding a great amount of data and, in addition, any such identifying equipment must be extremely rugged, substantially maintenance-free and as inexpensive as possible.

In the present invention, therefore, the apparatus employed at each of the railroad cars for transforming and transmitting the data assigned thereto is extremely simple, rugged, substantially maintenance-free and substantially immune to environmental conditions encountered in operation. In addition, the equipment of the invention is capable of extremely reliable operation and operates with low power input. For example, the interrogating signal from the interrogating master station is utilized to provide the power for the initiation and development of the groups of bi-polar time spaced pulses representative of the assigned data and the control signal, respectively, as well as transmission thereof to the master station. This obviates the necessity for any power supply on the equipment associated with the individual railroad cars.

FIG. 1 is a diagrammatic illustration of a typical communication system of this invention showing one master and one coded slave station thereof respectively. Although only one station is illustrated, it will be understood that the system contemplates a large number of coded slave stations, each of which is associated with a particular railroad car to be identified, as well as a plurality of master stations, disposed at different locations along the rail system, to read the car information as a particular car passes a portion of track where the master station is located.

As a particular railroad car enters a master station location, means may be provided for automatically initiating the generation and transmission of an interrogating pulse from the master station. This initiating means assures that the particular car to be interrogated is within the selected transmission range to be suitably influenced by the interrogating signal. Such means may be associated with the track and are conventional.

The symbols which may be sent and received by the communication system of this invention may represent any selected data such as the digits of numerical notation, letters of the alphabet, or any other arbitrary symbols which may be chosen. It is well-known that data may be represented in the binary system by only the two quantities "one" and "zero." In the binary system, for example, a signal on one of two different lines, the presence or absence of a signal or a positive and negative signal may be conveniently utilized to represent a binary "one" and "zero" respectively. Preferably, for purposes of this invention pulses of one polarity represent a binary "one" and pulses of the opposite polarity a binary "zero." Hereinafter, therefore, for simplicity of explanation throughout the specification a positive pulse represents a binary "one" and a negative pulse a binary "zero." Since a definite response for both a binary "one" and a binary "zero" is assumed, any transmission failure may be more reliably interpreted as an error. For example, if neither receiver responds during a pulse period, or if both receivers respond, an error is positively identified.

In accordance with this invention each unit to be identified is provided with apparatus such that each unit constitutes an individually coded slave station. The apparatus includes a pick-up means for receiving an interrogating signal from a master station and a passive circuit means for developing two groups of bi-polar time spaced pulses in response thereto. One group of bi-polar pulses represents, in binary form, the specific information associated with the unit to be identified and the other group represents a control signal marking the spaces between the binary data pulses. The two groups of bi-polar pulses are transmitted to the master station on two pairs of polarity oriented frequencies. The binary data and control signal pulses are developed and transmitted in response to, and from the power of, the received interrogating signal so that the apparatus at the unit to be identified requires no separate power supply. Further, the control signal pulses are utilized to obviate the need for maintaining accurate timing of the data and control signal pulses so developed.

Each master station is adapted to "read" the information from each of the units to be identified. To this end, in accordance with this invention, each master station includes means for generating and transmitting the interrogating signal. Conveniently, the above means may be energized in response to a signal which indicates that the unit to be identified is present at a predetermined location.

When the unit to be identified is present at the predetermined location, power is sent to the slave station thereof. This power is applied to a passive pulse sequence generator which develops and delivers pulses to two outputs with alternate pulses going to each output. The first pulse, and alternate pulses thereafter, are utilized to transmit data and the second and alternate pulses are utilized as a control signal which marks the spaces between the data pulses. The data pulses are applied to a pulse selection means, such as a plug board or other type of matrix, where the polarity of the pulses may be suitably modified to provide a pulse group representing the specific identifying information in binary form. The two groups of bi-polar pulses are sent to the master station on two pairs of polarity oriented frequencies. The binary data and control signal pulses are received alternately at the master station by appropriate signal receiving means respectively. To assure that the signal receivers do not give a spurious response due to noise or the like when no signal is being transmitted, they are alternately energized and de-energized respectively. Thus, the respective signal receiver is in condition to receive a signal only during the time that its respective data or control signal pulse is being transmitted.

The received binary data pulses are applied to a shift register or other suitable means for storage therein. The received control signal pulses of one polarity are utilized to initiate the generation of shift pulses for shifting the binary data in the shift register or for selectively routing the incoming pulses to the particular storage location reserved for each specific pulse. Means are provided for counting both the received binary data pulses and the received control signal pulses of one polarity which means are adapted to give one output for a correct count, as determined by the predetermined capacity of the respective counter, and another or "error" output for an "extra" count. The correct count output signals from the two pulse counting means are applied to a count pass gate which produces an output upon the simultaneous application of the two correct count signals of the shift and data pulse counters and the last control signal pulse developed by the interrogated slave station.

Even though the correct number of pulses have been received from the interrogated station, however, the possibility exists that the data may be defective because a binary "one," for example, has been received as a binary "zero" or vice versa. To provide for checking the parity of the received binary data pulses, therefore, the binary coded data at each slave station is provided with an odd number of binary "one" pulses and means are provided to assure that for a correct data reception this odd number of binary "one" pulses are indicated. To this end the received binary "one" data pulses are applied to the input of a parity flip-flop circuit to change the operating condition thereof. In this way a failure of reception, for example, whereby an even number of binary "one" pulses are received, either through a misinterpretation of a pulse due to noise or the like, or through a complete failure to record any binary "one" pulses, positively shows up as an error.

The correct parity signal and the output of the count pass gate are applied to a parity pass gate which produces an output in response to these two signals and, through additional circuit means, activates the control circuitry of an associated electronic computer to cause the stored binary data to be transferred from the data storage means to the data input of the computer in response to clock and control signals therefrom.

Only when the various checking circuits at the master station have indicated that the transmitted and received binary data are in exact correspondence, therefore, is the control circuitry of the associated electronic computer actuated to initiate the transfer of the binary data from the shift register to the data input of the computer.

Since it is desirable to cause the interrogation of the slave station to be repeated as soon as an error has been determined, a repeat gate is provided. The repeat gate is enabled upon receipt of either an extra count error signal, or a parity error signal.

The respective error signals as well as a signal from the control circuitry of the computer signifying the completion of the data transfer are also applied through a delay means to a reset and control circuit means which provides for de-energizing the signal receivers and for resetting the shift pulse counter, the data pulse counter, the parity flip-flop circuit, and the bi-stable circuit which activates the control circuitry of the computer and conditions the repeat gate so that all this equipment is returned to its initial operating condition. The reset and control circuit means provides these operations upon the completion of the transfer of correctly received identifying data, as well as, when the data is defective and a re-interrogation of the unit to be identified is required. Thus, the equipment at the master station is returned to its initial operating condition either in preparation for a repeated interrogation of the unit or for the receipt of an initiating signal indicating the presence of another unit to be identified at the predetermined interrogating location.

FIG. 1 illustrates a single coded slave station A and master station B. The coded slave station is associated with a particular railroad car and the master station is adapted to "read" the information therefrom.

The equipment at the slave station includes a receiving means 1 capable of utilizing power from an interrogating signal transmitted by the master station. The interrogating signal may be sent and received by radio-frequency transmission and receiving means in well-known manner. When such type of transmission means are employed, receiver means 1 may be a detector such as, for example, a crystal detector. Since the cost of the equipment at each of the slave stations, however, should be kept to a minimum, I prefer to transfer the interrogating signal from the master to the coded slave station by transformer action. To this end a sending and receiving winding 2 and 3, respectively, are provided. An interrogating pulse from pulse generator 4 applied to the winding 2 at the master station is transferred to the receiving winding 3 at the selected coded slave station by transformer action. This is extremely practical since the loop windings of the master station may be very conveniently disposed at a location sufficiently near the track to provide suitable coupling between the sending windings of the master station and the receiving windings of the car being interrogated. Thus, very reliable and efficient power transfer may be provided. Further, such windings are much less expensive than the transmission and receiving equipment required for radio-frequency transmission of the interrogating signal. Furthermore, the transformer can operate at a frequency where radiation of the signal is negligible at distances substantially larger than is required for the proper operation of the system.

The interrogating signal received by winding 3 at the slave station is applied to the input winding 5 of a pulse producing means 6. Preferably, pulse producing means 6 is a magnetic delay element 7 which is adapted to produce a uniform sequence of time spaced pulses from a single initiating pulse. Magnetic delay element 7 is more fully described and is claimed in U.S. Patent No. 2,923,834, to Bernard Silverman, entitled "Magnetic Delay Element," and assigned to the assignee of the present invention.

As described more fully in the above United States patent, No. 2,923,834 to Silverman, the element 7 is preferably composed of a magnetic material having a substantially rectangular hysteresis characteristic. In the figure, the element 7 is shown as having an input leg 8 and ten output legs 9, 10, 11, 12, 13, 14, 15, 16, 17 and 18 respectively. Although the drawing is not to scale, it will be understood that in practice input leg 8 should have a minimum cross-sectional area at least equal to the sum of the combined minimum cross-sectional areas of all of the output legs in order to provide a return path for saturating flux flow through the output legs. The element 7 may also be tapered as shown since the minimum cross-sectional areas of the upper and lower portions of the element respectively, which are necessary to provide sufficient flux paths to saturate all of the output legs, must be greater to the right of leg 9 than to the right of leg 10, etc.

It is to be further understood that, although in general, any desired number of output legs may be used, when used as the pulse producing means 6 of the present invention, the element 7 should have as many data output legs as there are data pulses required to give the system a sufficient capacity to encode the required amount of data. For example, the element 7 illustrated in FIG. 1 has a total of ten output legs; alternate output legs being utilized for data and control signal pulses respectively. As shown in FIG. 1, therefore, element 7 has five data output legs and is capable of producing five data pulses.

Input winding 5 is wound on input leg 8 and data output windings 19, 20, 21, 22 and 23 are wound on output legs 9, 11, 13, 15 and 17 respectively. Control signal windings 24, 25, 26, 27 and 28 are wound on the alternate output legs 10, 12, 14, 16 and 18. Windings 24, 25, 26, 27 and 28 are connected in series to provide a control signal in the form of a group of time spaced pulses marking the spaces between the data pulses on windings 19, 20, 21, 22 and 23, respectively, and are available on terminals 29 and 30. The control signal pulses are utilized at the master station, in a manner to be described in more detail hereinafter, to obviate the need for providing that the data pulses be developed having an accurate time interval therebetween. Preferably, windings 24, 25, 26, 27 and 28 are connected as shown so as to provide that the last pulse of the control signal group is of a polarity opposite that of the remainder of the pulses.

The data output windings are connected to a pulse selection means 31. Pulse selection means 31 may be, for example, a plug board, a plurality of switches or other suitable means to provide for connecting the data pulse output windings in series and selectivity modifying their polarity. For simplicity, pulse selection means 31 is shown schematically as a plug board with one particular pulse polarity selection shown by the broken line patch leads 32. This particular pulse selection is shown in FIG. 2A and represents the coded data of a particular railroad car. The output of pulse selection means 31 is available on output terminals 33 and 34.

Output terminals 33 and 34 are connected to the input terminals 35 and 36 of polarity-sensitive transmitting means 37. Similarly output terminals 29 and 30 are connected to the input terminals 38 and 39 of a similar polarity-sensitive transmitting means 40. Transmitting means 37 and 40, respectively, are adapted to transmit output pulses of one polarity on one frequency and pulses of the opposite polarity on a different frequency. More particularly, for example, transmitting means 37 transmits positive data pulses on a frequency denominated $f_1$ and negative data pulses on a frequency $f_2$. Transmitting means 40 transmits positive control signal pulses on a frequency $f_3$ and negative control signal pulses on a frequency $f_4$.

Any conventional type of transmitting apparatus may be employed for accomplishing the required polarity-oriented transmission of both the data and control signal pulse groups. For example, transmitting means 37 and 40 may each include two separate transmitters each of which is tuned to the required frequency, for example, $f_1$–$f_2$ and $f_3$–$f_4$ respectively. Alternatively, a single transmitter may be provided which includes suitable switching circuitry to provide for the required polarity-oriented transmission.

Again, however, since equipment cost and power requirements should be kept as low as possible, I prefer to employ a single polarity-sensitive oscillator for each of means 37 and 40, which oscillator is adapted to produce oscillations at a first frequency in response to a positive input signal and oscillations at a second frequency in response to a negative input signal. A polarity-sensitive oscillator of this type, and one especially adapted for use in the practice of this invention, is disclosed and claimed in my copending application entitled "Polarity-Sensitive Oscillator," Serial No. 113,855, filed May 31, 1961, and assigned to the assignee of the present invention.

The data output pulses are in the form of a particular bi-polar group wherein a pulse of one-polarity is designated a binary "one" and a pulse of the other polarity a binary "zero." These bi-polar pulses are transmitted by transmitter means 37 on a first pair of frequencies $f_1$ and $f_2$. In like manner the control signal pulses are transmitted by transmitter means 40 on a second pair of frequencies $f_3$ and $f_4$.

The equipment at the master station, in addition to the means previously described for generating and transmitting the interrogating signal, comprises signal receiving means 41 and 42 for alternately receiving the two pairs of frequencies. Signal receiving means 41 and 42 may be of a type known in the art and should have a bandwidth sufficient to receive the pulse group signals from the interrogated station. The master station further includes a plurality of circuit means, in novel combination, which operate upon the received signals to provide checking, counting and resetting operations, for example, prior to relaying the data to an associated electronic computer in response to a signal therefrom.

The presence of a railroad car at a particular track location in the vicinity of the master station may be utilized in any convenient manner, many of which are known, to initiate the interrogating or "reading" operation of the coded slave station associated with that specific car.

The receipt of an initiating signal from car presence detector 43 to bi-stable circuit 44, turns circuit means 44 to an "on" condition energizing pulse generator 4 and causing power to be transferred from winding 2 at the master station to winding 3 at the slave station as described hereinbefore. The power received at the slave station causes the development and transmission therefrom of two groups of bi-polar time spaced pulses. One group of pulses represents the data associated with that particular slave station in binary form and the other group marks the spaces between the data pulses which may be utilized at the master station to selectively route the data pulses and to operate upon the received data pulses to assure reliability, as well as, for providing the received data in a form suitable for direct application to the input of an associated electronic computer.

In FIG. 2, A and B, there is shown a particular bi-polar data pulse group and its associated control signal pulse group respectively. For purposes of providing the proper operations on the received data for the embodiment illustrated in FIG. 1, the first pulse developed in response to the received interrogating signal must be a data pulse and the last pulse developed a control signal pulse. Further, the last control signal pulse should have a different polarity from the other control signal pulses.

As stated hereinbefore the signal from the car presence detector 43 is applied to an OR gate 45 and sets bi-stable circuit 44 to its "on" condition energizing pulse generator 4. OR gate 45 may be, for example, a diode logic circuit of the type illustrated at page 134 of the General Electric Company Transistor Manual, 5th edition. The output of bi-stable circuit 44 is also applied through a delay means 46 to the "on" input terminal 47 of a receiver control means 48. Delay means 46 assures that transients due to energizing pulse generator means 4 will not interfere with the signal receiving means. The signal applied to terminal 47 of the receiver control means produces an output at terminal 49 thereof which is applied to control input terminal 50 and causes data pulse receiver 41 to be energized and in condition to receive information transmitted from the interrogated slave station. Control signal pulse receiver 42, however, remains in an nonenergized condition and is, therefore, prevented from producing a spurious response due to noise or the like.

Receiver control means 48, for example, may include two bi-stable circuits in suitable combination with two AND gates wherein respective output signals from one bi-stable circuit are applied to one input of the respective AND gates and output signals from the other bi-stable circuit are applied to the other input terminals of both said AND gates. In the following detailed description the respective operations of receiver control means 48 will be more fully covered so that the combination of the circuits making up receiver control means 48 will be evident to those skilled in the art.

Depending upon the particular coded combination of positive and negative pulses selected at the slave station to represent the data assigned thereto, the first data pulse developed at the interrogated slave station may be either a binary "one" or a binary "zero." As described hereinbefore, however, the first pulse developed by the slave station is a data pulse. In response to the delayed initiating signal from car presence detector 43 to receiver control means 48, data pulse receiver 41, therefore, has been rendered in a condition to receive this first pulse which has been developed in response to the interrogating signal.

Regardless of whether the received data pulse is a binary "one" or a binary "zero" it is applied to the storage position of the data storage means appropriate for this first data pulse and is also applied to one of the input terminals of OR circuit 52. Conveniently, the data storage means may be a shift register 51. Shift register 51, for example, may be of the type shown in the General Electric Transistor Manual, 5th edition, page 110, FIG. 11.3*c*. The output of OR circuit 52 is applied to the input terminal 53 of receiver control 48. The input terminal 53 causes receiver control 48 to deactivate data pulse receiver 41 and activate control pulse receiver 42. This renders control pulse receiver 42 in condition to receive the next expected transmitted signal and prevents a spurious response due to noise or the like from data pulse receiver 41. At the same time the output of OR circuit 52 is applied to the count input of data pulse counter 54.

The second pulse developed by the slave station in response to the interrogating signal is a control signal pulse of a selected polarity. For purposes of this description all control signal pulses except the last will be of positive polarity and will be designated "control shift" pulses. The last pulse, however, is of negative polarity and will be designated a "control pulse." A control signal pulse group such as this is shown particularly in FIG. 2*b*.

Since the input on terminal 53 of receiver control 48 has energized control pulse receiver 42, this receiver is now in condition to receive the first control signal pulse developed and transmitted by the interrogated slave station. Also, since this first control signal pulse is of a positive polarity it appears as a shift pulse on terminal 55 of control pulse receiver 42. This received shift pulse is applied to one input of OR circuit 56. The output of OR circuit 56 energizes shift pulse generator 57 and the appropriate shift pulse generated thereby is applied to the terminal 58 of shift register 51. The received control signal pulse or "control shift" pulse is also applied to the input of a control shift pulse counter 59. Data pulse counter 54 and control shift pulse counter 59 may be pulse counters of known type such as a binary counter of the type shown in the General Electric Transistor Manual, 5th edition, at page 110, FIG. 11.3*b*.

The appropriate shift pulse applied to the shift bus input terminal 58 of shift register 51 causes the previously received data pulse to be shifted to the second stage thereof. At the same time, the received control shift pulse applied to shift pulse counter 59 causes the counter to advance one count.

The binary "one" input terminal 60 of data pulse receiver 41 is also connected to the input of a parity flip-flop circuit means 61. Circuit means 61, for example, may be a bi-stable circuit employed as a binary cell in known manner. The received binary "one" data pulses cause parity circuit means 61 to change from one operating condition to the other. The received binary "zero" data pulses, however, do not alter the operating condition of parity circuit means 61. When the data is entirely received, therefore, the state of parity flip-flop circuit 61 will indicate whether or not the required odd number of binary "one" pulses have been received. One reason for requiring an odd number of binary "one" pulses in the data pulse group is that an absence of received binary "one" pulses would give an even number indication. If the parity check were on an even number basis, therefore, indication of error would not be shown by a complete failure of transmission, for example.

The presence of the first shift pulse on terminal 55 of control pulse receiver 42 in addition to being applied to one of the inputs of OR gate 56 is also applied to another input terminal 63 of receiver control 48 which causes control pulse receiver 42 to be de-energized and data pulse receiver 41 to be energized and in condition to receive the next data pulse to be transmitted. Since data and control pulses are developed and transmitted alternately, this operation is sequentially repeated to assure that the only time a pulse receiver is energized is when its respective transmitted pulse is expected.

When the predetermined number of pulses which are developed and transmitted by the slave station have been received by the master station, both the data pulse counter 54 and the shift pulse counter 59 should indicate a correct count. For example, if less signals are received than transmitted the count will be less than the correct number, while if more signals are received the respective counter will indicate an "extra count."

One output terminal 64, termed the correct count output of data pulse counter 54, and one output 65, similarly termed the correct count output, of "control shift" pulse counter 59 are connected to the input terminals 66 and 67, respectively, of count pass gate 68. Also, the correct count output from shift pulse counter 59 is applied through OR gate 69 to one input terminal 70 of circuit means 71 setting it to a "no" condition and indicating an "apparent" error in the received data. The "no" condition of circuit means 71 causes an output to be present on terminal 72 thereof which is applied to one input terminal 73 of repeat gate 74. This input conditions repeat gate 74, which is enabled to initiate a repeat operation in response to an error input signal to its other input terminal 75 from OR gate 76 indicating a count or parity failure and, therefore, an actual error in the received data.

The last or "control" pulse, being of opposite polarity from that of the "control shift" pulses, is present on the terminal 77 of control pulse receiver 42 and is applied to the other input terminal 78 of count pass gate 68. With a correct count indicated by input signals present at the other terminals 66 and 67 of count pass gate 68, from data and shift pulse counters 54 and 59 respectively, the presence of this "control" pulse causes an output to be applied from count pass gate 68 to one of the input terminals 79 of parity pass gate 80. This signal is also applied to one of the input terminals 81 of a parity fail gate 82. Since the arrival of the last control signal pulse signifies the end of transmission from the interrogated slave station this received control pulse on terminal 77 of receiver 42 is also applied to the "off" control terminal 115 of receiver control means 48 causing both signal receivers 41 and 42 to be de-energized.

Since the parity check is on a determination by parity flip-flop circuit means 61 of the reception thereby of an odd number of binary "one" data pulses, correct parity results in a signal on the "odd" output terminal 83 of parity flip-flop circuit 61. This output is applied to the input terminal 84 of parity pass gate 80. When inputs are present at the parity pass gas input terminals 79 and 84 this indicates that the data and shift pulse count is not only correct, but also that the count is correct at the very time that it is required to be, as confirmed by the "control" pulse applied to, and producing an output from, count pass gate 68. For example, for simplicity it may be assumed that the correct count inputs at terminals 66 and 67 condition count pass gate 68 for the "control" pulse expected to appear on terminal 78 thereof. A correct count output from data and shift pulse counters 54 and 58, respectively, either before or after the reception of the last or "control" pulse by pulse receiver 42 can not cause an input to be present at the terminal 79 of parity pass gate 80.

The two input signals on terminals 79 and 84 produce an output at the terminal 85 of parity pass gate 80 which is applied to the terminal 86 of circuit means 71 changing the condition thereof from a "no" or "apparent" defective data received indication, to a "yes" or actually correct data received indication. The "yes" condition causes an output to be present on terminal 87 of the circuit means 71 and to be removed from the terminal 72 thereof. This output signal on terminal 87 is applied to bi-stable circuit 44 turning it off and de-energizing pulse generator 4. The output on terminal 87 caused by the "yes" condition of circuit means 71 is also applied to the input terminal 88 of the control circuitry of the associated electronic computer 90.

The receipt of an input to computer control terminal 88 causes synchronized computer control and clock signals to be applied to the input terminals 91 and 92 respectively of a read-out circuit means 93. The output of read-out circuit means 93 is applied through OR gate 56 to shift pulse generator 57 to cause the contents of the shift register 51 to be transferred, under the control of the computer signals, to the input terminal 94 of computer 90.

When a complete and successful reception of data has been obtained, therefore, both the data pulse counter 54 and the control shift pulse counter 59 are indicating a correct count and output signals are present on their correct count terminals 64 and 65 respectively. These correct count signals together with the odd output signal from parity circuit means 61 are utilized in the count pass gate 68 and the parity pass gate 80 in conjunction with the received "control" pulse to indicate a correct reception of data and initiate the transfer of the data from the shift register 51 to the input of the computer 90 as described in detail hereinbefore.

A defective reception of data, due to noise or the like, causes extra count error signals to be developed by one or both of the pulse counters 54 and 59. For example, a defective data pulse count cases an error signal to be present at the extra count terminal 105 thereof while a defective control shift pulse count causes an extra count signal to be present at the terminal 95 of shift pulse counter 59.

Similarly, a defective parity of the received data causes an error signal to be present on the even terminal 108 of parity circuit means 61. At various times during the reception of the complete data pulse group, the parity flip-flop circuit means 61 may indicate that an even number of binary "one" pulses have been received and therefore develop an even output which appears on terminal 108 thereof. The only "even" output from parity circuit means 61, however, which shows an actual parity failure is the even indication, and resulting output, at the end of the data transmission after all pulses have been transmitted and received. To assure that only the actual parity fail signal is utilized, a parity fail gate 82 is provided and is not enabled until the actual parity failure is indicated at the end of the interrogation.

The parity error or "even" signal on output terminal 108 of parity circuit means 61 is applied to one input terminal 109 of parity fail gate 82. The output from count pass gate 68 indicating a correct count and reception of the last or "control" pulse is applied to the other input terminal 81 thereof. Parity fail gate 82 is not enabled, therefore, until in addition to an input signal at terminal 109 thereof from parity circuit means 61, there is also an input signal present at terminal 81 from the output of count pass gate 68. When these two signals are present, enabling the gate, a definite parity failure is indicated.

The error signals from the data pulse counter and from the control shift pulse counter are applied to two input terminals of four input OR gate 76; the other input signals being the parity fail signal from partity fail gate 82 and a signal from the control circuitry of computer 90 signifying the completion of the transfer of data.

The output of OR gate 76 is applied to the input terminal 75 of repeat gate 74 and also through a delay means 97 to a reset and control circuit means 98. When input signals are present at both terminals 73 and 75 of repeat gate 74 an output signal is developed which is applied over conductor 107 to OR gate 45 causing the interrogation of the unit to be repeated. This condition is obtained for either an error in count or parity or both.

When a correct reception of data has been obtained, however, and the control circuitry of the computer causes a signal to be developed signifying the completion of the data transfer operation, circuit means 71 is in the "yes" condition to produce an output on terminal 87 as described hereinbefore. Thus, no output is present at the terminal 72 to be applied to the terminal 73 of repeat gate 74. The output of OR gate 76, therefore, due to the computer control signal signifying the completion of the data transfer, in the absence of the "no" output signal on terminal 73 is not sufficient to enable repeat gate 74. This computer control signal at the completion of the data transfer operation, therefore, does not cause a re-interrogation of the unit.

It is desirable that the pulse counters 54 and 59, the parity circuit means 61, and circuit means 71 be returned to their initial operating conditions and the signal receivers 41 and 42 be de-energized for a repeated interrogation, as well as, for a completed and successful reception of data. To this end, the output of OR gate 76 is also applied through delay means 97 to reset and control circuit means 98 which provides these operations in response to an input signal. For simplicity of explanation the various leads from reset and control circuit means 98 to the various circuits and counters are not shown in detail but will be obvious to one skilled in the art. Further, if receiver control means 48 utilizes bi-stable circuits and "AND" gates, no actual control operation therefrom is required as resetting of the bi-stable circuits may be utilized to de-energize the signal receivers. The term "reset and control" means, therefore, is intended to denominate the circuit means for returning the above listed circuits to their initial operating condition as well as de-energizing the signal receivers whether or not any actual control circuitry is utilized therein. Delay means 97 is required to assure that the circuit means 71 is not reset to a "yes" condition before the error signal from OR gate 76 is applied to terminal 75 of repeat gate 74 which would prevent repeat gate 74 from being enabled thereby.

Reset and control means 98, therefore, is activated in response to an error signal from either data pulse counter 54, control shift pulse counter 59, parity fail gate 82, or the signal from the computer 90 signifying the completion of the data transfer operation. The output of reset and control circuit means 76 is operative to reset data pulse counter 54, control shift pulse counter 59, parity circuit means 61, and circuit means 71 to their initial operating conditions and also cause the signal receivers 41 and 42 to be de-energized.

After the received data has been operated upon by the various checking circuits at the master station, and either an error has been detected or the data has been found correct and been "read" into the computer in response to, and in synchronism with, the computer control and clock signals, the operation of reset and control circuit means 98 renders the appropriate master station equipment in a condition to perform its required functions again, either for a repeated interrogation of the unit, or in response to the next initiating signal from car presence detector 43 indicating that another car is in position to be interrogated.

The present invention, therefore, provides an improved communication system particularly adapted for the identification of a great number of individual objects or units; for example, railroads cars or the like. The system has great reliability and provides that the information received at the master station from the object or unit to be identified is reliability checked and in a form which is synchronized and compatible with requirements of modern electronic computing and data processing equipment. Further, the equipment utilized at each unit to be identified for developing and transmitting the data and control signal pulse groups is inexpensive, extremely rugged, free from maintenance, unaffected in operation under a wide variety of environmental conditions and requires no separate power supply.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A communication system comprising: a plurality of individually coded slave stations each including passive circuit means for developing two groups of bi-polar time spaced pulses in response to a received interrogating signal, one group representing specific data associated with an individual slave station in binary form and the other group representing a control signal marking the spaces between said data pulses; means for transmitting said data and control signal pulses on first and second pairs of polarity-oriented frequencies respectively: and at least one master station including means for interrogating said slave station; means for alternately receiving said data and control signal pulses respectively; means for selectively routing and storing said received binary data; means responsive to respective received data and control signal pulses for determining the correspondence between the pulses developed and transmitted by the interrogated slave station and the pulses received by the master station; means responsive to error signals developed by said last mentioned means for causing the re-interrogation of said slave station; and means responsive to said error signals and to a signal signifying the completion of a successful data reception for returning the master station equipment to its initial operating condition.

2. A communication system comprising: a plurality of individually coded slave stations each including passive circuit means for developing a predetermined number of time spaced pulses in response to a received interrogating signal from a master station; means for selecting the first and alternate developed pulses and selectively modifying the polarity thereof to provide a first group of bi-polar time spaced pulses representing specific data assigned to said slave station in binary form; means for selecting the second and alternate developed pulses to provide a second group of bi-polar pulses marking the spaces between said data pulses and representing a control signal, said control signal being utilized to obviate any requirement for maintaining accurate timing between said developed pulses; means for transmitting said two groups of bi-polar pulses on first and second pairs of polarity-oriented frequencies respectively: and at least one master station including means for generating and transmitting said interrogating signal; means for receiving said data and control signal pulses respectively; means responsive to said received data and control signal pulses respectively for selectively routing and storing said received binary data; means responsive to said received data and control signal pulses respectively for determining the correspondence between the data and control signal pulses developed and transmitted by the interrogated slave station and the data and control signals received by said master station and for developing appropriate correct and error signals representative thereof; means responsive to said error signals for causing the re-interrogation of said slave station; means for preventing a spurious response from said signal receiving means; and means responsive to said error signals as well as to a signal signifying the completion of a successful data reception by said master station for returning said master station equipment to its initial operating condition.

3. A communication system comprising: a plurality of individually coded slave stations each including passive circuit means for developing a predetermined number of time spaced pulses in response to a received interrogating signal from a master station; means for selecting the first and alternate developed pulses and selectively modifying the polarity thereof to provide a first group of bi-polar time spaced pulses representing specific data assigned to said slave station in binary form; means for selecting the second and alternate developed pulses to provide a second group of bi-polar pulses marking the spaces between said data pulses and representing a control signal, said control signal being utilized to obviate any requirement for maintaining accurate timing between said developed pulses; means for transmitting said two groups of bi-polar pulses on first and second pairs of polarity-oriented frequencies respectively: and at least one master station including means for generating and transmitting said interrogating signal; means for receiving said data and control signal pulses respectively; means responsive to said received data and control signal pulses respectively for selectively routing and storing said received binary data; means responsive to said received data and control signal pulses respectively for determining the correspondence between the data and control signal pulses developed and transmitted by the interrogated slave station and the data and control signals received by said master station and for developing correct and error signals representative thereof; means responsive to error signals from said last mentioned means for causing the re-interrogation of said slave station; means responsive to received data and control signals for maintaining the respective signal receiving means in a de-energized condition except during the period in which its respective pulse is expected; and means responsive to said error signals as well as to a signal signifying the completion of a successful data reception by said master station for returning said master station equipment to its initial operating condition.

4. A communication system comprising: a plurality of individually coded slave stations each including passive circuit means for developing two groups bi-polar time spaced pulses in response to a received interrogating signal, one group representing specific data associated with an individual slave station in binary form and the other group representing a control signal marking the spaces between said data pulses; means for transmitting said data and control signal pulses on first and second pairs of polarity-oriented frequencies respectively: and at least one master station including means for generating and transmitting said interrogating signal; means for alternately receiving said data and control signal pulses respectively; means for selectively routing and storing said received binary data pulses; a plurality of checking circuit means responsive to respective received data and control signal pulses for determining the correspondence between the data and control signal pulses developed and transmitted by the interrogated slave station and the data and control signal pulses received at said master station and for developing appropriate correct and error signals indicative of such correspondence; means responsive to said error signals for causing said interrogation to be repeated; means responsive to said correct signal for causing said stored binary data to be transferred to, and under control of clock signals from, an associated electronic computer; and means for returning the respective equipment of said master station to its initial operating condition at the termination of said data transfer and for a repeated interrogation respectively.

5. The communication system of claim 4 wherein the means at said master station for transmitting, and the pick-up means at said slave station for receiving said interrogating signal are loop windings respectively and wherein said signal is transferred from said master station to said slave station by transformer action thereof.

6. A communication system comprising: a plurality of individually coded slave stations each including passive circuit means for developing two groups of bi-polar time spaced pulses in response to a received interrogating signal, one group representing specific data associated with an individual slave station in binary form and the other group representing a control signal marking the spaces between said data pulses; means for transmitting said data and control signal pulses on first and second pairs of polarity-oriented frequencies respectively: and at least one master station including means for generating and transmitting said interrogating signal; means for alternately receiving said data and control signal pulses respectively; means for selectively routing and storing said received binary data pulses; a plurality of checking circuit means responsive to respective data and control signal pulses for determining the correspondence between the data and control signal pulses developed and transmitted by the interrogated slave station and the data and control signal pulses received at said master station and for developing appropriate correct and error signals respectively indicative of such correspondence; means responsive to said error signals for causing said interrogation to be repeated; means responsive to said correct signal for de-energizing said means for generating and transmitting said interrogating signal; further means responsive to said correct signal for causing said stored binary data to be transferred to, and under control of clock pulses from, an associated electronic computer; means responsive to said error signal for causing said interrogating operation to be repeated; and means responsive to a signal from said computer and to said error signal for returning the respective equipment of said master station to its initial operating condition at the completion of said data transfer and for a re-interrogation operation respectively.

7. A communicaion system comprising: a plurality of individually coded slave stations each including passive circuit means for developing two groups of bi-polar time spaced pulses in response to a received interrogating signal, one group representing specific data associated with an individual slave station in binary form and the other group representing a control signal marking the spaces between said data pulses, said control signal being utilized to obviate the need for maintaining timing between the pulses developed; means for transmitting said data and control signal pulses on first and second pairs of polarity-oriented frequencies respectively: and at least one master station including means for generating and transmitting said interrogating signal; means for alternately receiving said data and control signal pulses respectively; a plurality of checking circuit means responsive to the respective data and control signal pulses received for checking the parity and count thereof; means for selectively routing and storing said received binary data pulses; means responsive to an error signal from said respective checking circuit means for causing said interrogation to be repeated; means responsive to the last control signal pulse developed by said interrogated slave station for de-energizing said signal receiving means; means responsive to a correct signal from said checking circuit means indicating correct count and parity for de-energizing said interrogating signal generating and transmitting means; means also responsive to a correct indication from said checking circuit means for initiating the transfer of said stored binary data to the input of an associated electronic computer in response to clock signals therefrom; and means for resetting said plurality of checking circuit means and for de-energizing said data and control signal receiving means at the termination of said data transfer as well as for a repeated interrogation.

8. A communication system comprising: a plurality of individually coded slave stations each including passive circuit means for developing two groups of bi-polar time spaced pulses in response to a received interrogating signal, one group representing specific data associated with an individual slave station in binary form and the other group representing a control signal marking the spaces between said data pulses; means for transmitting said data and control signal pulses on first and second pairs of polarity-oriented frequencies respectively: and at least one master station including means responsive to an initiating signal indicating the presence of a slave station at a predetermined location for generating and transmitting said interrogating signal; signal receiving means for alternately receiving said data and control signal pulses respectively; receiver control means responsive to said initiating signal for energizing said data signal receiving means, said means being responsive alternately thereafter to received control signal pulses and data pulses for energizing the opposite receiving means and de-energizing the instant receiving means respectively and being further responsive to the last received control signal pulse of predetermined relative polarity for de-energizing said signal receiving means; means responsive to said received data and control signal pulses respectively for selectively routing and storing said received binary data pulses; checking circuit means including means for counting said received data and control signal pulses respectively and for determining the parity of the received data pulses to determine the correspondence between the two groups of pulses developed at the slave station and between the two groups of pulses received at the master station; means responsive to an appropriate error signal from one of said checking circuit means indicating defective transmission or reception of signals for causing said slave station to be re-interrogated; means responsive to a correct signal from said respective checking circuit means indicating both correct transmission and reception of signals for activating the control circuitry of an associated electronic computer; read-out means responsive to clock and control signals from said computer for causing the stored binary data to be transferred under control of said clock pulses to the input of said computer; and means for resetting the respective circuitry of said master station to initial operating conditions both upon completion of said data transfer and for a re-interrogating operation respectively.

9. A communication system comprising: a plurality of individually coded slave stations each including passive circuit means for developing two groups of bi-polar time spaced pulses in response to a received interrogating signal, one group representing specific data associated with an individual slave station in binary form and the other group representing a control signal marking the spaces between said data pulses, said alternately developed control signal pulses thereby assuring accurate relationship between data and control signal pulses regardless of the accuracy of the overall timing of said developed pulses; means for transmitting said data and control signal pulses on first and second pairs of polarity-oriented frequencies respectively: and at least one master station including means responsive to an initiating signal indicating the presence of a slave station at a predetermined location for generating and transmitting said interrogating signal thereto; means for alternately receiving said data and control signal pulses respectively; means responsive to said received data and control signal pulses for selectively routing and storing said received data pulses; checking circuit means responsive to the respective data and control signal pulses received for checking the parity and count of said received data pulses; receiver control means responsive to said initiating signal for energizing said signal receiving means, said means being further responsive to the last control signal pulse of opposite polarity than the remainder thereof for de-energizing said data and control signal receiving means, said receiver control means further alternately de-energizing a respective signal receiving means in response to a received signal to provide that said signal receiver means are in a de-energized condition at all times except when a respective pulse is expected; means responsive to a correct signal from said checking circuit means for de-energizing said interrogating signal generating and transmitting means and for activating read-out circuit means for causing the stored binary data to be transferred to the data input of an associated electronic computer under the control of the clock signals thereof; means responsive to an error signal from said checking circuit means for causing the interrogation of said slave station to be repeated; and means for returning the respective equipment of said master station to its initial operating condition upon the completion of said transfer of data as well as for a repeated interrogation operation.

10. A communication system comprising: a plurality of individually coded slave stations each including passive circuit means for developing two groups of bi-polar time spaced pulses in response to a received interrogating signal, one group representing specific data associated with an individual slave station in binary form and the other group representing a control signal marking the spaces between said data pulses; means for transmitting said data and control signal pulses on first and second pairs of polarity-oriented frequencies respectively: and at least one master station including means for generating and transmitting said interrogating signal; means for alternately receiving said data and control signal pulses respectively; receiver control means responsive alternately to received data and control signal pulses for energizing the opposite receiving means and de-engerizing the instant receiving means respectively and further responsive to a predetermined signal indicating the end of transmission for de-energizing both said signal receiving means to maintain said receivers in a de-energized condition except when a respective signal is expected; means responsive to said received data and control signal pulses for selectively routing and storing said received binary data pulses; checking circuit means including means for counting said received data and control signal pulses respectively and means for determining the parity of the received data pulses, said checking circuit means being adapted to determine the correspondence between the two groups of pulses developed and between the two groups of pulses received; means responsive to an appropriate error signal from one of said checking circuit means indicating defective transmission or reception of signals for causing said slave station to be re-interrogated; means responsive to a correct signal from said respective checking circuit means indicating both correct transmission and reception of signals for activating the control circuitry of an associated electronic computer; read-out means responsive to clock and control signals from said computer for causing the stored binary data to be transferred under control of said clock pulses to the input of said computer; and means for resetting the respective circuitry of said master station to initial operating conditions both upon completion of such data transfer and for a re-interrogating operation respectively.

11. A communication system comprising: a plurality of individually coded slave stations each including means for receiving an interrogating signal from a master station; means responsive to said received interrogating signal and operative to develop two groups of time spaced pulses, one group including the first pulse developed and alternate pulses thereafter to provide data pulses and the other group including the second pulse developed and alternate pulses thereafter to provide control pulses, the last pulse developed being a control pulse having a different polarity than the other pulses thereof to provide with said other control pulses a control signal pulse group; means for selectively modifying the polarity of said data pulses to provide a data signal pulse group representative of specific data assigned to an individual coded slave station; means for transmitting said data and control signal pulse groups on first and second pairs of polarity-oriented frequencies respectively: and at least one master station including means for generating and transmitting an interrogating signal; signal receiving means for alternately receiving said first and second pairs of frequencies representing said data and control signals respectively; a shift register; means for applying said received binary data pulses to the respective stages of said shift register to store said binary data therein; first and second means responsive to received data pulses of either polarity for counting said pulses and for de-energizing said data signal receiver means and energizing said control signal receiving means, said means being further responsive to provide the inverse operation in response to control signal pulses of one-polarity and for de-energizing both signal receiving means in response to the last received control signal pulse of opposite polarity; means responsive to received control signal pulses of one-polarity for generating shift pulses; means for counting said control signal pulses of one polarity; means for applying said generated shift pulses to said shift register to provide that said binary data is selectively routed and stored therein; a count pass gate enabled by the correct count indication of said control signal and data pulse counters and the last control signal pulse of opposite polarity; parity circuit means responsive to received binary one data pulses for determining whether an odd or an even number thereof have been received; a parity pass gate enabled by the output of said count pass gate and the odd output of said parity circuit means; means responsive to the output of said parity pass gate for activating the control circuitry of an associated electronic computer; means responsive to computer control and clock signals for causing the contents of said shift register to be transferred to the data input of said computer; a repeat gate responsive to a correct count signal and an error signal from said data pulse counter, said control signal pulse counter or said parity circuit means respectively for causing the re-interrogation of said slave station; and means responsive to said error signals, as well as a signal from said computer signifying the completion of said data transfer operation, for returning the appropriate master station equipment to its initial operating condition.

References Cited in the file of this patent

UNITED STATES PATENTS

| | | |
|---|---|---|
| 2,623,939 | Deer | Dec. 30, 1952 |
| 2,864,943 | Schultz | Dec. 16, 1958 |
| 2,966,659 | Dahlbom et al. | Dec. 27, 1960 |
| 2,972,127 | Lukoff et al. | Feb. 14, 1961 |
| 3,045,210 | Langley | July 17, 1962 |